(12) United States Patent
Park et al.

(10) Patent No.: US 11,863,281 B2
(45) Date of Patent: Jan. 2, 2024

(54) METHODS AND APPARATUS TO FACILITATE CROSS-CARRIER BEAM ASSOCIATION

(71) Applicant: QUALCOMM Incorporated, San Diego, CA (US)

(72) Inventors: Sungwoo Park, Seoul (KR); Wooseok Nam, San Diego, CA (US); Kiran Venugopal, Raritan, NJ (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 17/179,285

(22) Filed: Feb. 18, 2021

(65) Prior Publication Data

US 2021/0344403 A1 Nov. 4, 2021

Related U.S. Application Data

(60) Provisional application No. 63/018,399, filed on Apr. 30, 2020.

(51) Int. Cl.
*H04W 24/10* (2009.01)
*H04W 56/00* (2009.01)
(Continued)

(52) U.S. Cl.
CPC ............ *H04B 7/088* (2013.01); *H04W 24/10* (2013.01); *H04W 56/001* (2013.01); *H04W 74/0833* (2013.01); *H04W 76/27* (2018.02)

(58) Field of Classification Search
None
See application file for complete search history.

(56) References Cited

U.S. PATENT DOCUMENTS 10,772,119 B2 * 9/2020 Zhou ..................... H04L 5/0053
11,240,809 B2 * 2/2022 Tsai .................. H04W 56/0015
(Continued)

OTHER PUBLICATIONS

Catt: "Remaining Issues of NR Power Control," 3GPP Draft, 3GPP TSG RAN WG1 Meeting #94bis, R1-1810525_PC, 3rd Generation Partnership Project (3GPP), Mobile Competence Centre; 650, Route Des Lucioles; F-06921, Sophia-Antipolis Cedex; France, vol. RAN WG1, No. Chengdu, China, Oct. 8, 2018-Oct. 12, 2018, Sep. 29, 2018 (Sep. 29, 2018), XP051517933, 6 pages, Retrieved from Internet: URL: http://www.3gpp.org/ftp/tsg%5Fran/WG1%5FRL1/TSGR1%5F94b/Docs/R1%2D1810525%2Ezip [retrieved on Sep. 29, 2018] 4 Power control for cross beam indication.
(Continued)

*Primary Examiner* — Edan Orgad
*Assistant Examiner* — Emmanuel K Maglo
(74) *Attorney, Agent, or Firm* — Procopio, Cory, Hargreaves & Savitch LLP

(57) ABSTRACT

Apparatus, methods, and computer-readable media for facilitating cross-carrier beam association are disclosed herein. An example method for wireless communication at a UE includes receiving, from a base station, an indication of a cross-carrier beam association associated with a first carrier and a second carrier different than the first carrier. The example method also includes determining an association between a first set of beams of the first carrier and a second set of beams of the second carrier based on the indication of the cross-carrier beam association. Additionally, the example method includes receiving on the first set of beams and the second set of beams based on the determined cross-carrier beam association.

30 Claims, 10 Drawing Sheets

(51) Int. Cl.
H04W 76/27 (2018.01)
H04B 7/08 (2006.01)
H04W 74/08 (2009.01)

(56) References Cited

U.S. PATENT DOCUMENTS

| | | | |
|---|---|---|---|
| 2005/0176385 A1* | 8/2005 | Stern-Berkowitz ... | H04W 36/18 455/73 |
| 2011/0128922 A1* | 6/2011 | Chen .................... | H04L 5/0007 370/329 |
| 2014/0062763 A1* | 3/2014 | Kishigami ............. | G01S 3/74 342/158 |
| 2014/0098774 A1* | 4/2014 | Gao ..................... | H04W 72/23 370/329 |
| 2016/0081139 A1* | 3/2016 | Akhavan-Saraf ... | H04W 72/541 370/338 |
| 2016/0373233 A1* | 12/2016 | Pelletier ............... | H04W 72/20 |
| 2017/0257889 A1* | 9/2017 | Mukherjee ........... | H04W 76/15 |
| 2017/0295502 A1* | 10/2017 | Stirling-Gallacher ..................... H04W 56/001 |
| 2017/0303264 A1 | 10/2017 | Islam et al. | |
| 2019/0045559 A1* | 2/2019 | Huang ................. | H04B 17/318 |
| 2019/0349867 A1* | 11/2019 | MolavianJazi ....... | H04W 52/40 |
| 2021/0297939 A1* | 9/2021 | Lu ......................... | H04W 4/70 |
| 2022/0295304 A1* | 9/2022 | Matsumura ........... | H04W 16/28 |
| 2022/0408277 A1* | 12/2022 | Yang .................... | H04W 16/28 |

OTHER PUBLICATIONS

International Search Report and Written Opinion—PCT/US2021/018883—ISA/EPO—dated Jun. 21, 2021.

* cited by examiner

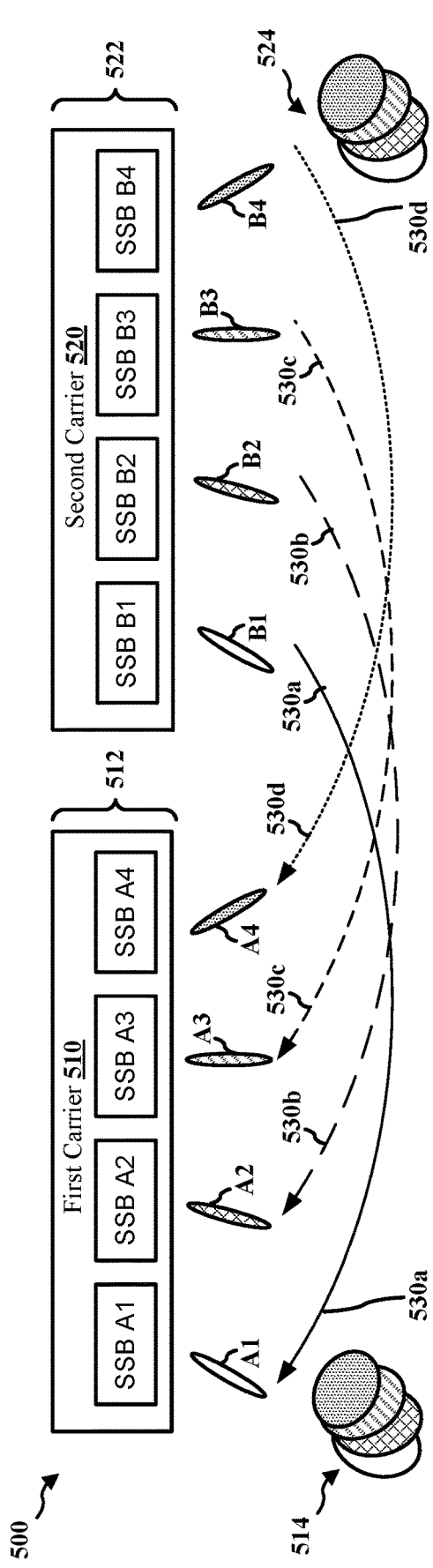
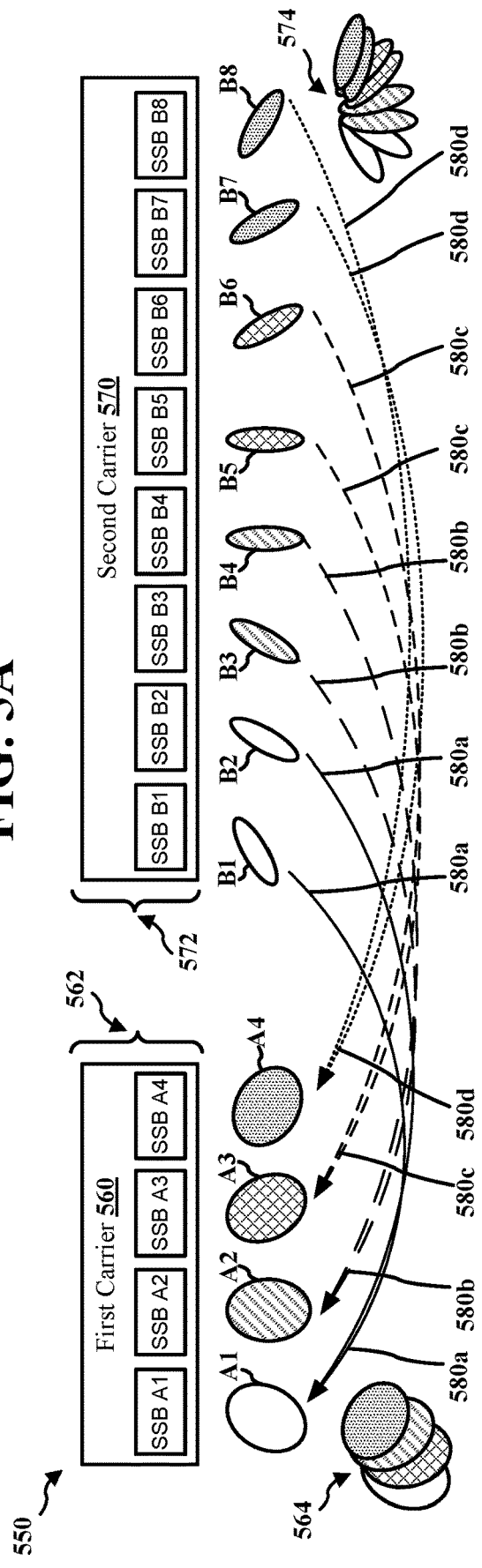
FIG. 5A
FIG. 5B

METHODS AND APPARATUS TO FACILITATE CROSS-CARRIER BEAM ASSOCIATION

CROSS REFERENCE TO RELATED APPLICATION(S)

This application claims the benefit of U.S. Provisional Patent Application Ser. No. 63/018,399, entitled "Methods and Apparatus to Facilitate Cross-Carrier Beam Association," and filed on Apr. 30, 2020, which is expressly incorporated by reference herein in its entirety.

BACKGROUND

Technical Field

The present disclosure relates generally to communication systems, and more particularly, to wireless communication utilising cross-carrier beams.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some examples, a wireless device (e.g., a user equipment (UE)) may communicate using multiple carriers. For example, a UE configured for dual connectivity may be connected to two different base stations, and may be able to simultaneously transmit and receive data on multiple component carriers of the two different base stations. A UE configured for carrier aggregation may be able to simultaneously transmit and receive data on multiple component carriers from a same base station. In some such examples in which different carriers are used for communication, a synchronization signal block (SSB) burst may be assigned to each carrier. An SSB burst may include one or more SSBs, and each SSB associated with an SSB burst may be allocated to a beam. In some examples, the different carriers may be intra-band carriers. In some examples, the different carriers may be inter-band carriers within a same frequency range. In some examples, the different carriers may be inter-band carriers in different frequency ranges.

In an aspect of the disclosure, a method, a computer-readable medium, and an apparatus are provided for wireless communication of a UE. An example apparatus for wireless communication at a UE includes receiving, from a base station, an indication of a cross-carrier beam association associated with a first carrier and a second carrier different than the first carrier. The example apparatus also determines an association between a first set of beams of the first carrier and a second set of beams of the second carrier based on the indication of the cross-carrier beam association. Additionally, the example apparatus receives on the first set of beams and the second set of beams based on the determined cross-carrier beam association.

In another aspect of the disclosure, a method, a computer-readable medium, and an apparatus are provided for wireless communication of a base station. An example apparatus for wireless communication at a base station includes determining a cross-carrier beam association between a first set of beams of a first carrier and a second set of beams of a second carrier, the first carrier being different than the second carrier. The example apparatus also transmits, to a UE, an indication of the cross-carrier beam association associated with the first carrier and the second carrier. Additionally, the example apparatus transmits, to the UE, on the first set of beams and the second set of beams based on the determined cross-carrier beam association.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A is a diagram illustrating cross-carrier beam association for intra-band carriers or inter-band carriers within a same frequency range, in accordance with one or more aspects of this disclosure.

FIG. 5B is a diagram illustrating cross-carrier beam association for inter-band carriers across different frequency ranges, in accordance with one or more aspects of this disclosure.

DETAILED DESCRIPTION

Figure 1:
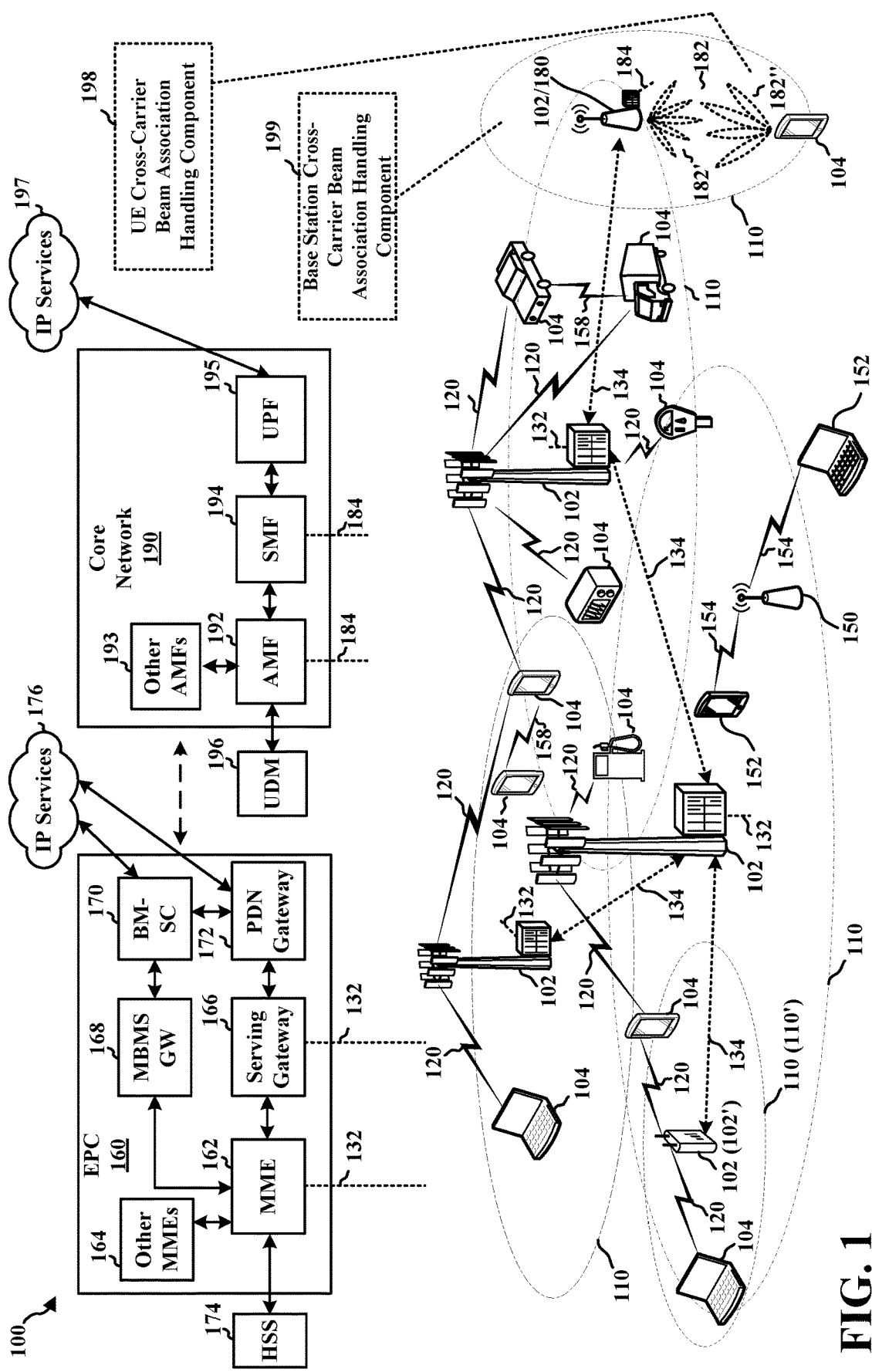
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" may be used interchangeably.

In some examples, a wireless device (e.g., a UE) may communicate using multiple carriers. For example, a UE configured for dual connectivity may be connected to two different base stations, and may be able to simultaneously transmit and receive data on multiple component carriers of the two different base stations. A UE configured for carrier aggregation may be able to simultaneously transmit and receive data on multiple component carriers from a same base station. In some examples in which different carriers are used for communication, a synchronization signal block (SSB) burst may be assigned to each carrier. An SSB burst may include one or more SSBs, and each SSB associated with an SSB burst may be allocated to a beam. In some examples, the different carriers may be intra-band carriers. In some examples, the different carriers may be inter-band carriers within a same frequency range. In some examples, the different carriers may be inter-band carriers in different frequency ranges.

Example techniques disclosed herein enable associating cross-carrier beams based on, for example, one or more similar characteristics. For example, one or more beams of a first carrier may be cross-carrier associated with one or more beams of a second carrier. In some examples, when a first beam of a first carrier is indicated as being cross-carrier associated with a second beam of a second carrier, then characteristics associated with the first beam may be applied to the second beam. For example, if the first beam and the second beam are indicated as having a similar delay spread, then a UE can determine the delay spread for the first beam and apply the determined delay spread to the second beam without separately determining the delay spread for the second beam.

FIG. 1 is a diagram illustrating an example of a wireless communications system and an access network 100 that includes UEs 104 in communication with base stations 102 or base stations 180. As an example, the UE 104 may be configured to manage one or more aspects of wireless communication by processing cross-carrier beam associations. As an example, in FIG. 1, the UE 104 may include a UE cross-carrier beam association handling component 198. In certain aspects, the UE cross-carrier beam association handling component 198 may be configured to receive, from a base station, an indication of a cross-carrier beam association associated with a first carrier and a second carrier different than the first carrier. The example UE cross-carrier beam association handling component 198 may also be configured to determine an association between a first set of beams of the first carrier and a second set of beams of the second carrier based on the indication of the cross-carrier beam association. Additionally, the example UE cross-carrier beam association handling component 198 may be configured to receive on the first set of beams and the second set of beams based on the determined cross-carrier beam association.

Still referring to FIG. 1, in certain aspects, the base station 102/180 may be configured to manage one or more aspects of wireless communication via cross-carrier beam associations. As an example, in FIG. 1, the base station 102/180 may include a base station cross-carrier beam association handling component 199. The example base station cross-carrier beam association handling component 199 may be configured to determine a cross-carrier beam association between a first set of beams of a first carrier and a second set of beams of a second carrier, the first carrier being different than the second carrier. The example base station cross-carrier beam association handling component 199 may also be configured to transmit, to a UE, an indication of the cross-carrier beam association associated with the first carrier and the second carrier. Further, example base station cross-carrier beam association handling component 199 may be configured to transmit, to the UE, on the first set of beams and the second set of beams based on the determined cross-carrier beam association.

Although the following description provides examples of cross-carrier beam associations directed to instances including two carriers, the concepts described herein may be applicable to any suitable quantity of carriers. Furthermore, while the following description provides examples directed to 5G NR, the concepts described herein may be applicable to other similar areas, such as LTE, LTE-A, CDMA, GSM, and/or other wireless technologies, in which cross-carrier beam associations may be beneficial.

The wireless communications system (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
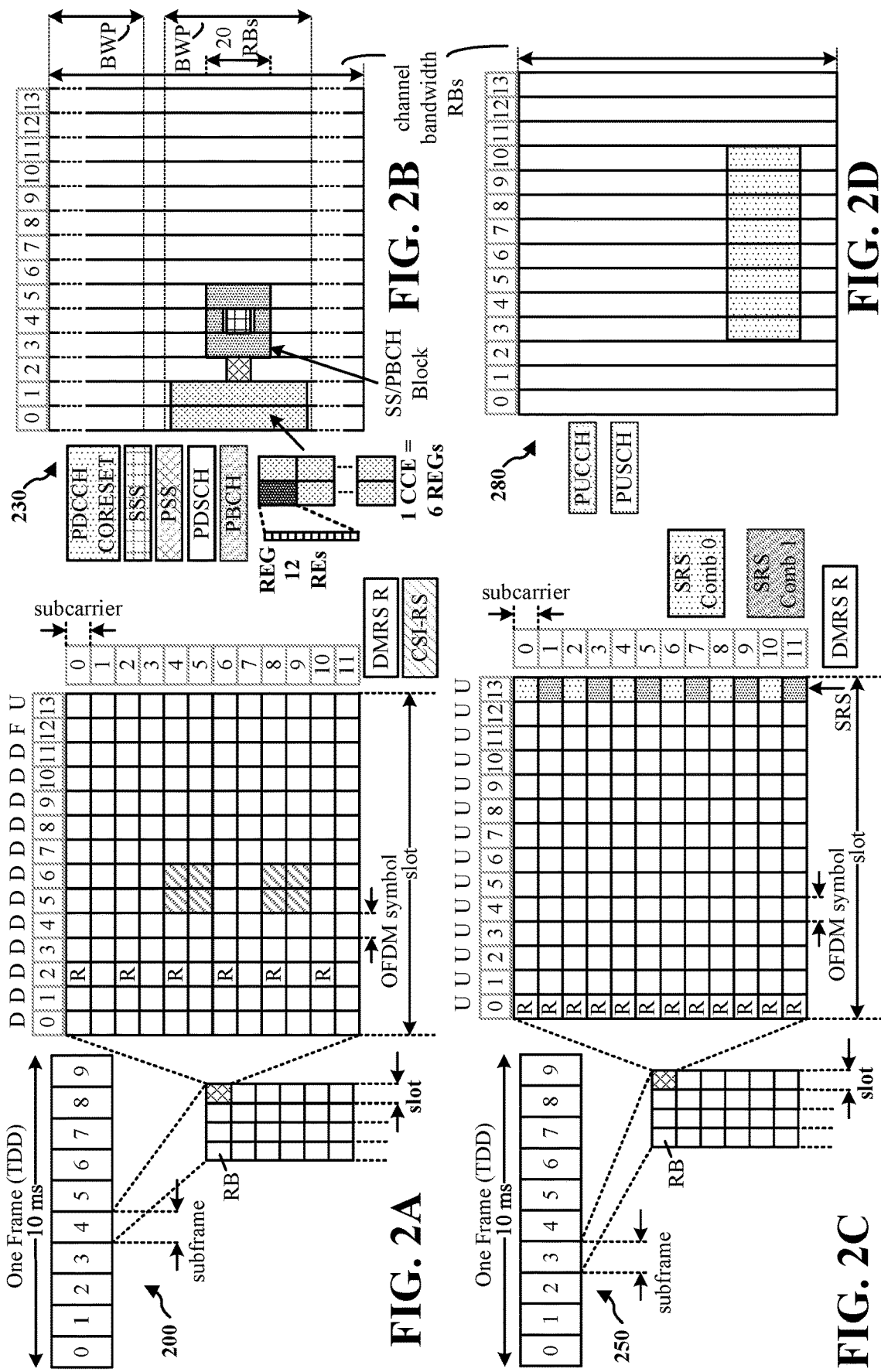
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
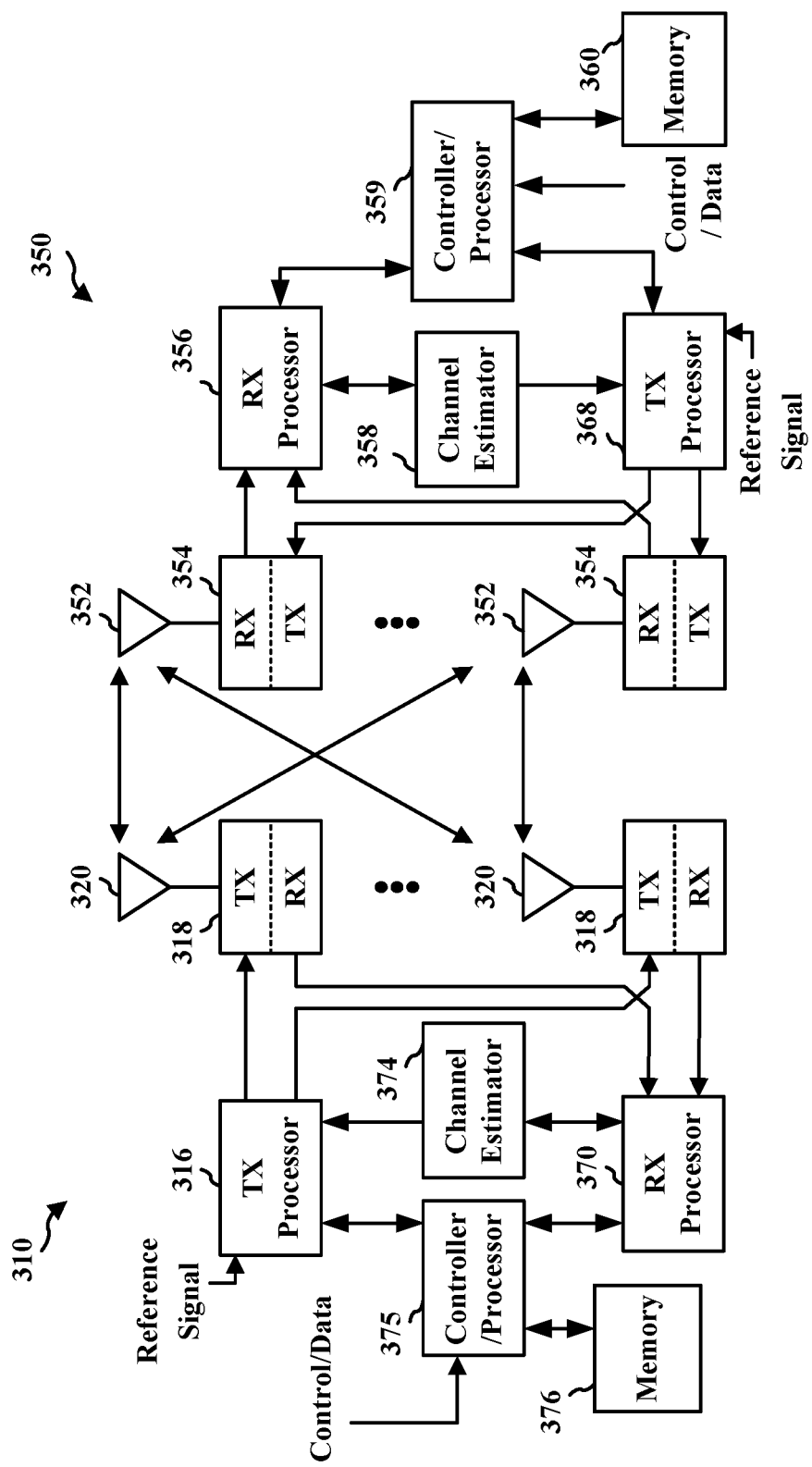
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the example UE cross-carrier beam association handling component 198 of FIG. 1.

At least one of the TX processor 316, the RX processor 370, and the controller/processor 375 may be configured to perform aspects in connection with the example base station cross-carrier beam association handling component 199 of FIG. 1.

Figure 4A:
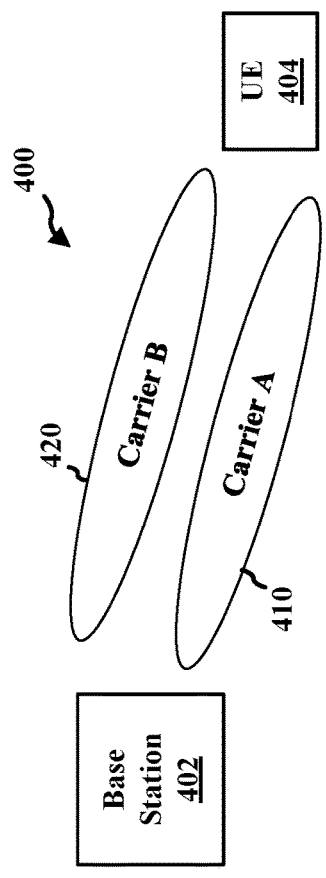
FIG. 4A is a diagram illustrating an example of cross-carrier communication between a base station and a UE, in accordance with one or more aspects of this disclosure.
Figure 4B:
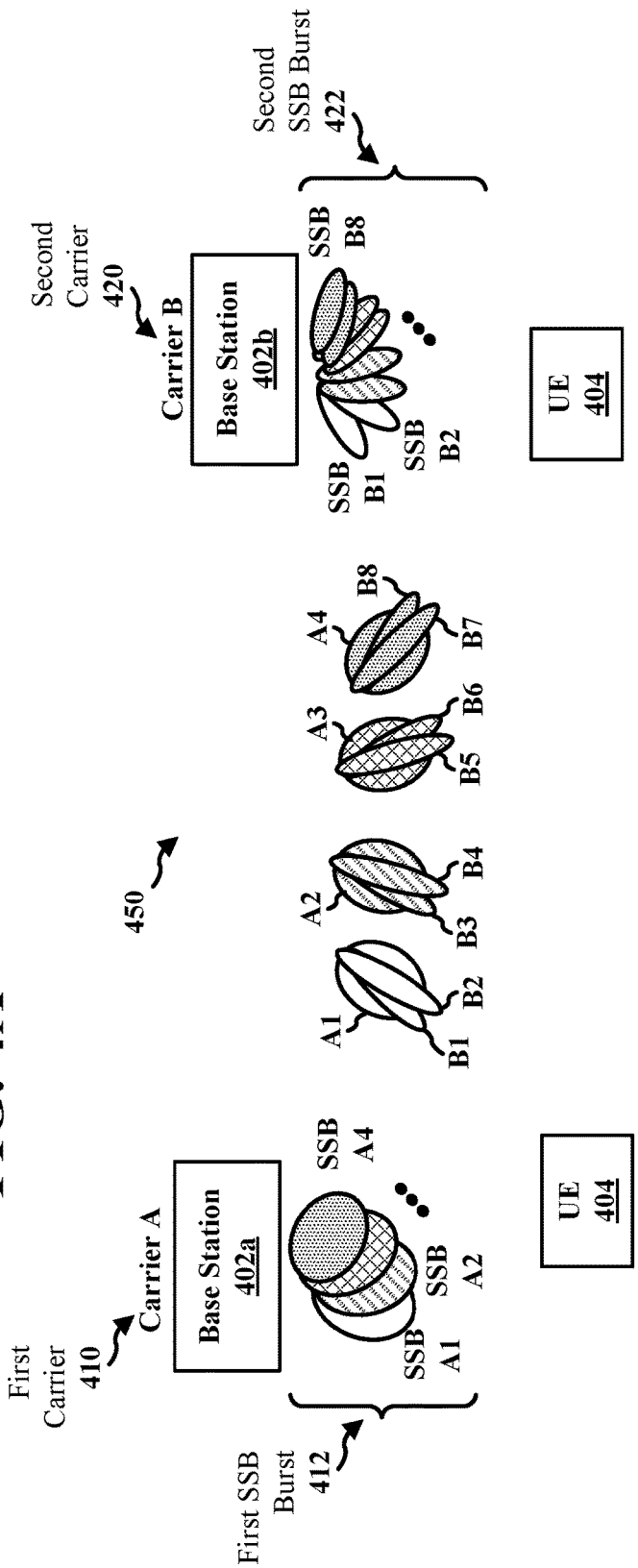
FIG. 4B is a diagram illustrating another example of cross-carrier communication between a first base station, a second base station, and a UE, in accordance with one or more aspects of this disclosure.

FIG. 4A is a diagram illustrating an example of cross-carrier communication 400 between a base station 402 and a UE 404, in accordance with one or more aspects of this disclosure. FIG. 4B is a diagram illustrating another example of cross-carrier communication 450 between a first base station 402a, a second base station 402b, and a UE 404, in accordance with one or more aspects of this disclosure. Aspects of the base station 402 may be implemented by the base station 102/180 and/or the base station 310. Aspects of the UE 404 may be implemented by the UE 104 and/or the UE 350.

In the illustrated example of FIG. 4A, the UE 404 and the base station 402 are in communication. For example, the base station 402 and the UE 404 may transmit and/or receive messages through a first carrier 410 ("Carrier A"). The base station 402 and the UE 404 may additionally or alternatively transmit and/or receive messages through a second carrier 420 ("Carrier B"). Although not shown in the example of FIG. 4A, it may be appreciated that each of the respective carriers 410, 420 may be associated with a set of beams. In some examples, the cross-carrier communication 400 of FIG. 4A may correspond to examples of carrier aggregation.

In the illustrated example of FIG. 4B, the UE 404 may be in communication with the first base station 402a through a first carrier (e.g., the first carrier 410). The UE 404 may additionally or alternatively be in communication with the second base station 402b through a second carrier (e.g., the second carrier 420). In some examples, the cross-carrier communication 450 of FIG. 4B may correspond to examples of dual connectivity.

In some examples, a carrier (e.g., the carriers 410, 420) may be associated with an operating band and a frequency range. For example, a first frequency range (FR1) may include frequencies between 410 MHz and 7125 MHz, and a second frequency range (FR2) may include frequencies between 24250 MHz and 52600 MHz. The respective frequency ranges may be further divided into operating bands that define a subset of frequencies. For example, a first operating band within FR1 may include frequencies between 1920 MHz and 1980 MHz for uplink transmissions and frequencies between 2110 MHz and 2170 MHz for downlink transmissions. A second operating band within FR1 may include frequencies between 1850 MHz and 1910 MHz for uplink transmissions and frequencies between 1930 MHz and 1990 MHz for downlink transmissions. The second frequency range (FR2) may also include operating bands. For example, a first operating band within FR2 may include frequencies between 26500 MHz and 29500 MHz for uplink transmissions and downlink transmissions, and a second operating band within FR2 may include frequencies between 24500 MHz and 27500 MHz for uplink transmissions and downlink transmissions.

Although the following description provides examples of SSB bursts associated with the cross-carrier communication 450 of FIG. 4B, it may be appreciated that the concepts may be applicable to the cross-carrier communication 400 of FIG. 4A.

An SSB may be used during a cell search procedure. For example, the UE 404 may search for synchronization signals when scanning for a cell to camp on. An SSB burst may be used to facilitate beamforming and/or beam sweeping. An SSB burst may include one or more SSBs and may be contained within a time window (e.g., 5 milliseconds). In some examples, the quantity and/or shape of a beam transmitting an SSB within an SSB burst may vary based on the operating band associated with the carrier. In the illustrated example of FIG. 4B, a first SSB burst 412 in the first carrier 410 includes four SSBs (or beams) A1, A2, A3, and A4. A second SSB burst 422 in the second carrier 420 includes eight SSBs (or beams) B1, B2, B3, B4, B5, B6, B7, and B8.

The beams of a carrier may be associated with one or more characteristics (sometimes referred to as "beam characteristics" or "radio channel characteristics"). For example, a beam may be associated with a Doppler shift, a Doppler spread, an average delay, a delay spread, and/or spatial information. While the beams associated with the first carrier 410 and the second carrier 420 may be associated with different operating bands and/or frequency ranges, in some examples, one or more beam(s) of the first carrier 410 may be related to one or more beam(s) of the second carrier 420. For example, in the illustrated example of FIG. 4B, the beam A1 of the first carrier 410 has similar spatial characteristics to the beams B1 and B2 of the second carrier 420, the beam A2 of the first carrier 410 has similar spatial characteristics to the beams B3 and B4 of the second carrier 420, the beam A3 of the first carrier 410 has similar spatial characteristics to the beams B5 and B6 of the second carrier 420, and the beam A4 of the first carrier 410 has similar spatial characteristics to the beams B7 and B8 of the second carrier 420.

Example techniques disclosed herein enable a base station to indicate a cross-carrier beam association between a first set of beams of a first carrier and a second set of beams of a second carrier. The cross-carrier beam association may indicate cross-carrier beams that share similar characteristics. For example, the cross-carrier beam association may indicate that the beam A1 of the first carrier 410 has similar spatial characteristics to the beams B1 and B2 of the second carrier 420. In some examples, a UE may use the cross-carrier beam association to assist with channel estimation, frequency offset estimations, and/or synchronization procedures. For example, if the beams A1, B1, and B2 are indicated as being cross-carrier associated, then the UE may measure a characteristic of the beam A1 and apply the value measured for the beam A1 of the first carrier 410 to the beams B1 and B2 of the second carrier 420.

FIG. 5A is a diagram illustrating cross-carrier beam association 500 for intra-band carriers or inter-band carriers within a same frequency range, in accordance with one or more aspects of this disclosure. In the illustrated example of FIG. 5A, a first set of SSBs 512 are transmitted in a first carrier 510 ("Carrier A") and a second set of SSBs 522 are transmitted in a second carrier 520 ("Carrier B"). In some examples, the first carrier 510 may be referred to as a primary cell (PCell) and the second carrier 520 may be referred to as a secondary cell (SCell). Aspects of the first carrier 510 may be implemented by the first carrier 410 of FIGS. 4A and 4B. Aspects of the second carrier 520 may be implemented by the second carrier 420 of FIGS. 4A and 4B. Aspects of the first set of SSBs 512 may be implemented by the first SSB burst 412 of FIG. 4B. Aspects of the second set of SSBs 522 may be implemented by the second SSB burst 422 of FIG. 4B.

In some examples, the first carrier 510 and the second carrier 520 of FIG. 5A may be intra-band carriers (e.g., carriers associated with a same operating band). In some examples, the first carrier 510 and the second carrier 520 of FIG. 5A may be inter-band carriers within a same frequency range (e.g., carriers associated with different operating bands within a same frequency range). For example, the first carrier 510 may be associated with a first operating band within a first frequency range (FR1) and the second carrier 520 may be associated with a second operating band within the first frequency range (FR1). As shown in the example of FIG. 5A, the SSBs of the respective sets of SSBs 512, 522 are transmitted on respective beams 514, 524. For example, with respect to the first set of SSBs 512, an SSB A1 is transmitted on a beam A1, an SSB A2 is transmitted on a beam A2, an SSB A3 is transmitted on a beam A3, and an SSB A4 is transmitted on a beam A4. With respect to the second set of SSBs 522, an SSB B1 is transmitted on a beam B1, an SSB B2 is transmitted on a beam B2, an SSB B3 is transmitted on a beam B3, and an SSB B4 is transmitted on a beam B4.

In the illustrated example of FIG. 5A, beams of the first set of beams 514 may have one or more characteristics that are similar to beams of the second set of beams 524. For example, the beams A1, A2, A3, A4 of the first set of beams 514 may be associated with a first beam width and the beams B1, B2, B3, B4 of the second set of beams 524 may be associated with a second beam width that is the same as the first beam width. In some such examples, it may be appreciated that the beams of the second set of beams 524 may overlap with the beams of the first set of beams 514 on the respective same beam widths. For example, the beam A1 of the first set of beams 514 may have a same beam width as the beam B1 of the second set of beams 524. Accordingly, the beam A1 of the first set of beams 514 and the beam B1 of the second set of beams 524 may be referred to as being cross-carrier associated. For example, a UE that measures a characteristic of the beam A1 may apply the measured value to the beam B1.

In some examples, based on the beams that are determined to be cross-carrier associated, a base station may transmit a message identifying cross-carrier beam associations. For example, the base station may transmit a message identifying a first cross-carrier beam association 530a between the beam A1 of the first set of beams 514 and the beam B1 of the second set of beams 524, a second cross-carrier beam association 530b between the beam A2 of the first set of beams 514 and the beam B2 of the second set of beams 524, a third cross-carrier beam association 530c between the beam A3 of the first set of beams 514 and the beam B3 of the second set of beams 524, and a fourth cross-carrier beam association 530d between the beam A4 of the first set of beams 514 and the beam B4 of the second set of beams 524.

FIG. 5B is a diagram illustrating cross-carrier beam association 550 for inter-band carriers across different frequency ranges, in accordance with one or more aspects of this disclosure. In the illustrated example of FIG. 5B, a first set of SSBs 562 are transmitted in a first carrier 560 ("Carrier A") and a second set of SSBs 572 are transmitted in a second carrier 570 ("Carrier B"). In some examples, the first carrier 560 may be referred to as a primary cell (PCell) and the second carrier 570 may be referred to as a secondary cell (SCell). Aspects of the first carrier 510 may be implemented by the first carrier 410 of FIGS. 4A and 4B and/or the first carrier 510 of FIG. 5A. Aspects of the second carrier 520 may be implemented by the second carrier 420 of FIGS. 4A and 4B and/or the second carrier 520 of FIG. 5A. Aspects of the first set of SSBs 562 may be implemented by the first SSB burst 412 of FIG. 4B and/or the first set of SSBs 512 of FIG. 5A. Aspects of the second set of SSBs 522 may be implemented by the second SSB burst 422 of FIG. 4B and/or the second set of SSBs 522 of FIG. 5A.

In the illustrated example of FIG. 5B, the first carrier 560 and the second carrier 570 are inter-band carriers across different frequency ranges. For example, the first carrier 560 may be associated with a first operating band within a first frequency range (FR1) and the second carrier 570 may be associated with a second operating band within a second frequency range (FR2).

As shown in the example of FIG. 5B, the SSBs of the respective sets of SSBs 562, 572 are transmitted on respective beams 564, 574. For example, with respect to the first set of SSBs 562, an SSB A1 is transmitted on a beam A1, an SSB A2 is transmitted on a beam A2, an SSB A3 is transmitted on a beam A3, and an SSB A4 is transmitted on a beam A4. With respect to the second set of SSBs 572, an SSB B1 is transmitted on a beam B1, an SSB B2 is transmitted on a beam B2, an SSB B3 is transmitted on a beam B3, an SSB B4 is transmitted on a beam B4, an SSB B5 is transmitted on a beam B5, an SSB B6 is transmitted on a beam B6, an SSB B7 is transmitted on a beam B7, and an SSB B8 is transmitted on a beam B8.

Similar to the example of FIG. 5A, in the illustrated example of FIG. 5B, the beams of the first set of beams 564 may have one or more characteristics that are similar to the beams of the second set of beams 574. For example, the beams A1, A2, A3, A4 of the first set of beams 564 may be associated with a first beam width and the beams B1, B2, B3, B4, B5, B6, B7, B8 of the second set of beams 574 may be associated with a second beam width that is different than the first beam width. For example, beams within FR1 may be "wide beams" and beams within FR2 may be "narrow beams." In some such examples, it may be appreciated that the beams of the second set of beams 574 may overlap with the beams of the first set of beams 564 on the respective beam widths. For example, the beam A1 of the first set of beams 564 may have a same beam width as the combined beam widths of the beams B1 and B2 of the second set of beams 574. Accordingly, the beam A1 of the first set of beams 564 may be referred to as being cross-carrier associated with the beams B1 and B2 of the second set of beams 574. For example, a UE that measures a characteristic of the beam A1 may apply the measured value to the beams B1 and B2.

In some examples, based on the beams that are determined to be cross-carrier associated, a base station may transmit a message identifying cross-carrier beam associations. For example, the base station may transmit a message identifying a first cross-carrier beam association 580a between the beam A1 of the first set of beams 564 and the beams B1 and B2 of the second set of beams 574, a second cross-carrier beam association 580b between the beam A2 of the first set of beams 564 and the beams B3 and B4 of the second set of beams 574, a third cross-carrier beam association 580c between the beam A3 of the first set of beams 564 and the beams B5 and B6 of the second set of beams 574, and a fourth cross-carrier beam association 580d between the beam A4 of the first set of beams 564 and the beams B7 and B8 of the second set of beams 574.

Although not shown in the illustrated example of FIGS. 5A and 5B, it may be appreciated that if an SSB in one carrier is indicated as being a single frequency network SSB, the associated SSBs in the other carrier(s) are also operating as single frequency network.

While the example of FIG. 5B provides examples in which two beams of the second set of beams 574 overlap with one beam of the first set of beams 564, it may be appreciated that in other examples, any suitable quantity of beams of the second set of beams 574 may overlap with one or more beams of the first set of beams 564. For example, if the first set of beams includes N beams, the second set of beams may include N*M beams, where the value "M" is an integer. Additionally, in some such examples, the second beam width may be approximately equal to 1/M the first beam width.

While the examples of FIGS. 5A and 5B provide examples of cross-carrier beam associations based on spatial information, it may be appreciated that in additional or alternative examples, the cross-carrier beam associations may be based on other suitable characteristics. For example, a first type of cross-carrier beam association may be based on Doppler shift, Doppler spread, average delay and delay spread, a second type of cross-carrier beam association may be based on Doppler shift and Doppler spread, a third type of cross-carrier beam association may be based on Doppler shift and average delay, and a fourth type of cross-carrier beam association may be based on spatial characteristics. Furthermore, in some examples, the cross-carrier beam association between the beams of the first carrier and the beams of the second carrier may be determined on a quasi co-location (QCL) relationship of the first set of beams and the second set of beams.

Figure 6:
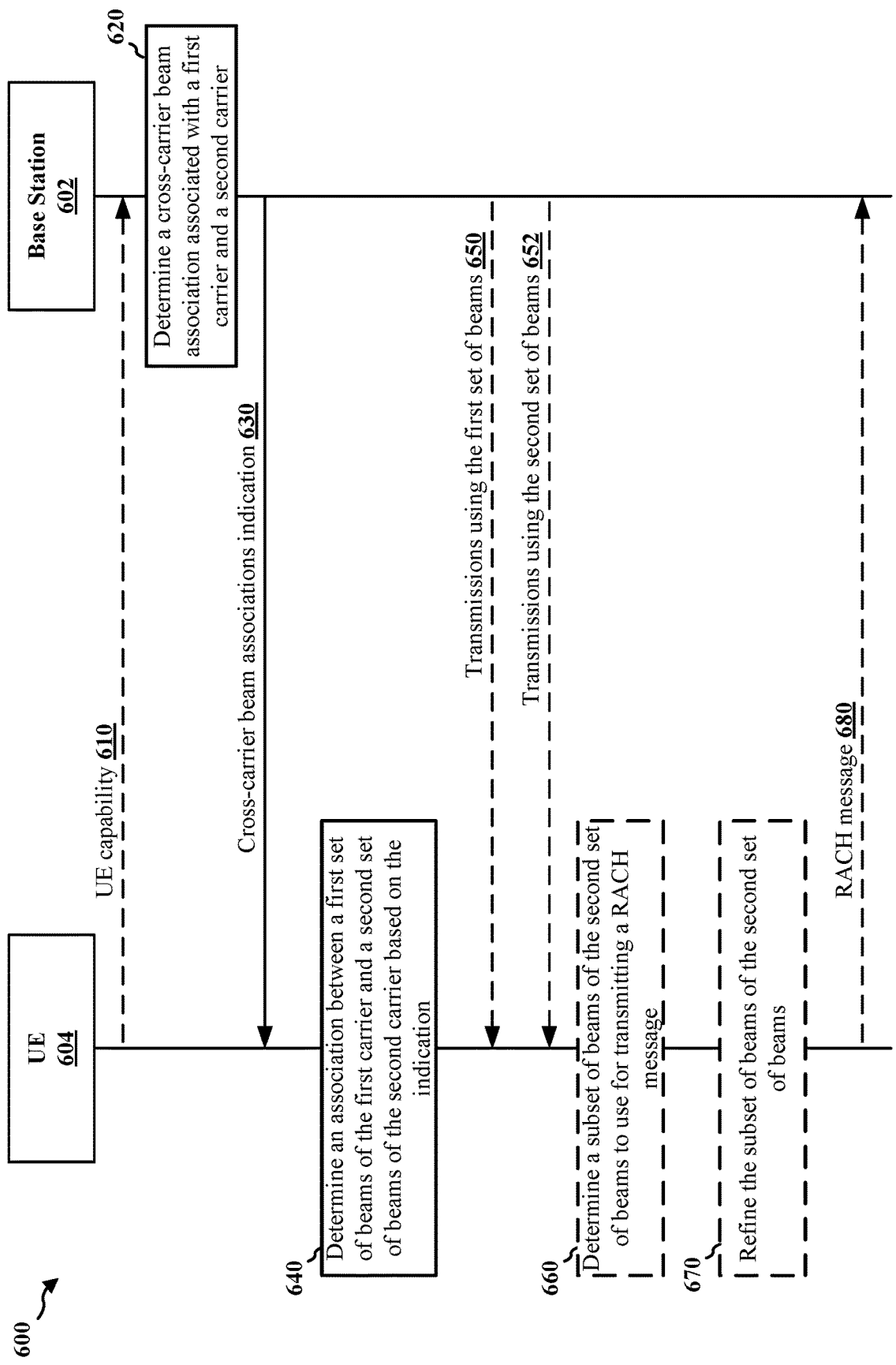
FIG. 6 is an example communication flow between a base station and a UE, in accordance with one or more aspects of this disclosure.

FIG. 6 illustrates an example communication flow 600 between a base station 602 and a UE 604, in accordance with one or more techniques disclosed herein. Aspects of the base station 602 may be implemented by the base station 102, the base station 180, the base station 310, and/or the base stations 402, 402a, 402b. Aspects of the UE 604 may be implemented by the UE 104, the UE 350, and/or the UE 404. Although not shown in the illustrated example of FIG. 6, it may be appreciated that in additional or alternative examples, the base station 602 may be in communication with one or more other base stations or UEs, and/or the UE 604 may be in communication with one or more other base stations or UEs.

In the illustrated example of FIG. 6, the UE 604 may transmit a UE capability 610 that is received by the base station 602. The UE capability 610 may include information regarding UE capabilities of the UE 604. For example, the UE capability 610 may indicate whether the UE 604 supports cross-carrier beam association.

At 620, the base station 602 determines a cross-carrier beam association associated with a first carrier and a second carrier. In some examples, the first carrier and the second carrier may be intra-band carriers. For example, the first carrier and the second carrier may be associated with a same operating band within a same frequency range. In some examples, the first carrier and the second carrier may be inter-band carriers within a same frequency range. For example, the first carrier and the second carrier may be associated with different operating bands within a first frequency range (FR1). In some examples, the first carrier and the second carrier may be inter-band carriers across different frequency ranges. For example, the first carrier may be associated with a first operating band within the first frequency range (FR1) and the second carrier may be associated with a second operating band within the second frequency range (FR2).

In some examples, the cross-carrier beam associations may be based on spatial information, as described above in connection with FIGS. 5A and 5B. In some examples, the cross-carrier beam associations may be based on one or more beam characteristics, such as Doppler shift, Doppler spread, average delay, delay spread, and/or spatial characteristics. For example, a first type of cross-carrier beam association may be based on Doppler shift, Doppler spread, average delay, and delay spread, a second type of cross-carrier beam association may be based on Doppler shift and Doppler spread, a third type of cross-carrier beam association may be based on Doppler shift and average delay, and a fourth type of cross-carrier beam association may be based on spatial characteristics. Furthermore, in some examples, the cross-carrier beam association between the first carrier and the second carrier may be determined on a QCL relationship of the first set of beams and the second set of beams.

The base station 602 transmits a cross-carrier beam associations indication 630 that is received by the UE 604. The cross-carrier beam associations indication 630 may include information identifying one or more beams of a first carrier that are cross-carrier associated with one or more beams of a second carrier. For example, the cross-carrier beam associations indication 630 may include, or otherwise indicate, the cross-carrier beam associations 530a-530d of FIG. 5A and/or the cross-carrier beam associations 580a-580d of FIG. 5B. The base station 602 may transmit the cross-carrier beam associations indication 630 via system information and/or RRC signaling. In some examples, if the UE capability 610 indicates that the UE 604 supports cross-carrier beam association, the base station 602 may transmit the cross-carrier beam associations indication 630 in an RRC message.

At 640, the UE 604 determines an association between a first set of beams of the first carrier and a second set of beams of the second carrier based on the cross-carrier beam associations indication 630. In some examples, the UE 604 may determine, based on the cross-carrier beam associations indication 630 which one or more beams of the first carrier are cross-carrier associated with one or more beams of the second carrier. For example, and with respect to the example of FIG. 5A, the UE 604 may determine, based on the first cross-carrier beam association 530a indicated by the cross-carrier beam associations indication 630, that the beam A1 of the first carrier 510 is cross-carrier associated with the beam B1 of the second carrier 520, and, thus, that the respective beams A1, B1 have one or more similar characteristics. With respective to the illustrated example of FIG. 5B, the UE 604 may determine, based on the first cross-carrier beam association 580*a* indicated by the cross-carrier beam associations indication 630, that the beam A1 of the first carrier 560 is cross-carrier associated with the beams B1 and B2 of the second carrier 570, and, thus, that the respective beams A1, B1, B2 have one or more similar characteristics.

The base station 602 may transmit transmissions using a first set of beams 650 that are received by the UE 604. The base station 602 may additionally or alternatively transmit transmissions using a second set of beams 652 that are received by the UE 604. The first set of beams 650 may be of the first carrier (e.g., the first set of beams 514 of the first carrier 510 of FIG. 5A and/or the first set of beams 564 of the first carrier 560 of FIG. 5B). The second set of beams 652 may be of the second carrier (e.g., the second set of beams 524 of the second carrier 520 of FIG. 5A and/or the second set of beams 574 of the second carrier 570 of FIG. 5B).

In some examples, the UE 604 may use the cross-carrier beam associations to improve performance at the UE. For example, the UE 604 may use the cross-carrier beam associations to help with channel estimation, frequency offset estimation, and/or synchronization procedures.

For example, in some examples, the cross-carrier beam associations indication 630 may indicate that an SSB of the first set of beams is associated with a random access channel (RACH) occasion (RO). In some examples, measuring SSBs on a first carrier (e.g., in the first frequency range (FR1)) may be more power efficient than measuring SSBs on a second carrier (e.g., in the second frequency range (FR2)). However, it may be more beneficial for the UE to use the second carrier to transmit a RACH message. At 660, the UE 604 may determine a subset of beams of the second set of beams to use for transmitting a RACH message. For example, while operating in an idle mode or an inactive mode, the UE 604 may measure SSBs received on a first carrier and transmit a RACH message on a second carrier. For example, and referring to the illustrated example of FIG. 5B, the UE 604 may measure the first set of SSBs 562 received on the first set of beams 564 of the first carrier 560. The UE 604 may select a first subset of beams of the first set of beams 564 of the first carrier 560 (e.g., the beams A2 and A3) based on the measurements of the first set of SSBs 562. The UE 604 may then determine a second subset of beams of the second set of beams 574 of the second carrier 570 that correspond to the selected first subset of beams of the first set of beams 564 (e.g., the beams A2 and A3) based on the cross-carrier beam associations. For example, the UE 604 may determine, based on the second cross-carrier beam association 580*b*, that the beams B3 and B4 of the second set of beams 574 correspond to the beam A2 of the first set of beams 564. The UE 604 may also determine, based on the third cross-carrier beam association 580*c*, that the beams B5 and B6 of the second set of beams 574 correspond to the beam A3 of the first set of beams 564. The UE 604 may then transmit a RACH message 680 using the second subset of beams of the second set of beams 574 (e.g., using the beams B3, B4, B5, and B6 of the second set of beams 574).

In some examples, the UE 604 may further refine the beams used for transmitting the RACH message 680. At 670, the UE 604 may refine the subset of beams of the second set of beams. For example, the UE 604 may measure SSBs received on the second subset of beams of the second set of beams 574 of the second carrier 570. For example, the UE 604 may measure SSBs B3, B4, B5, and B6 received on the beams B3, B4, B5, and B6 of the second carrier 570. The UE 604 may then refine the beams in the second subset of beams of the second set of beams 574 based on the measured SSBs received through the respective beams. For example, based on the measured SSBs B3, B4, B5, and B6, the UE 604 may determine to transmit the RACH message 680 through the beams B5 and B6. In some such examples, the UE 604 may perform the refining of the beams used for transmitting the RACH message 680 without measuring SSBs received on all of the beams of the second set of beams 574 of the second carrier 570.

It may be appreciated that by employing one or more of the techniques disclosed herein, the UE 604 may conserve resources (e.g., processing resources) by applying one or more characteristics associated with a beam of a first carrier to one or more beams of a second carrier. In some such examples, the UE 604 may avoid performing measurements on the one or more beams of the second carrier.

Figure 7:
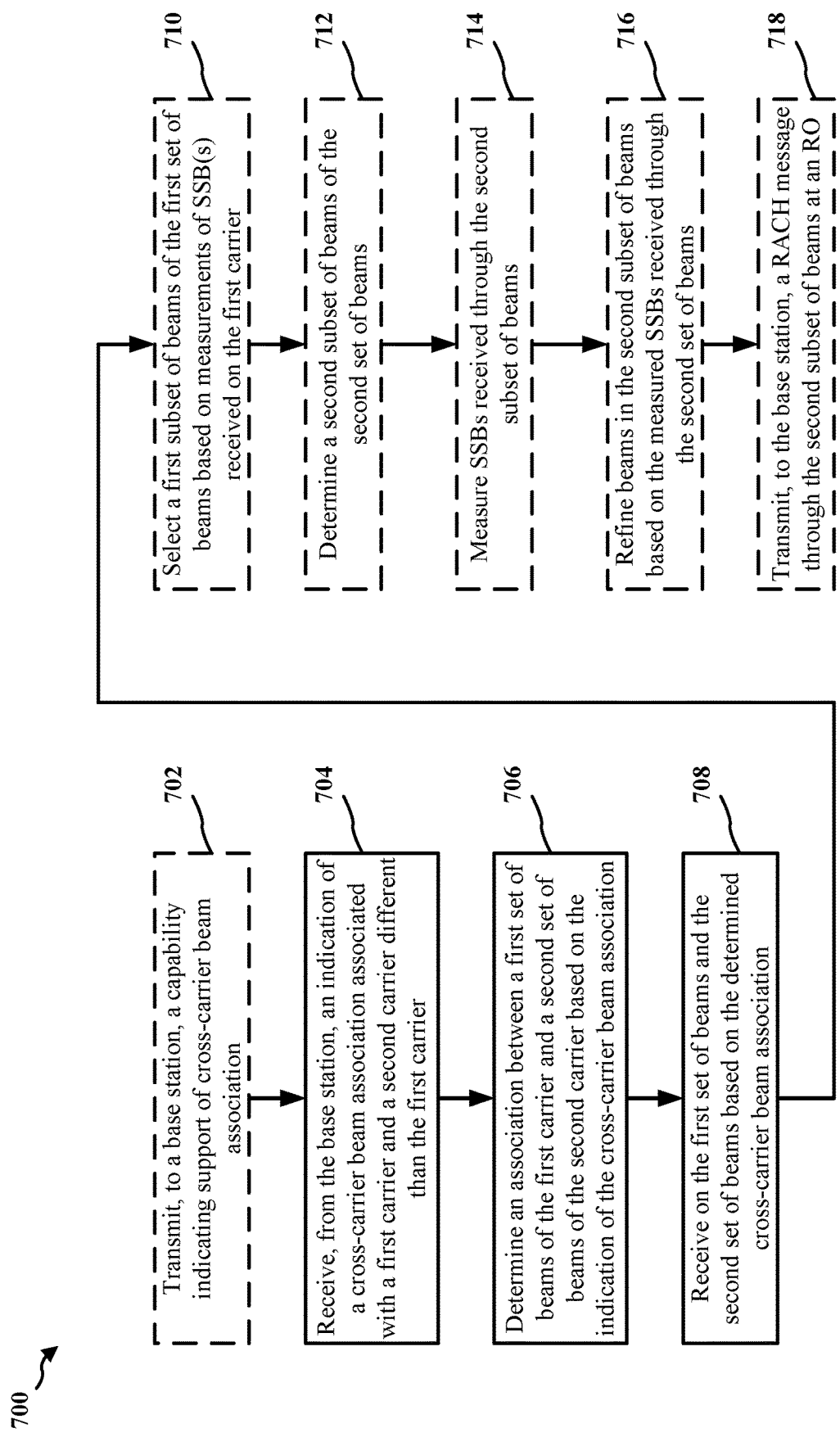
FIG. 7 is a flowchart of a method of wireless communication at a UE, in accordance with one or more aspects of this disclosure.

FIG. 7 is a flowchart 700 of a method of wireless communication. The method may be performed by a UE (e.g., the UE 104, the UE 350, and/or an apparatus 802 of FIG. 8). Optional aspects are illustrated with a dashed line. The method may enable a UE to determine cross-carrier beams that may share similar characteristics, which may assist the UE with channel estimation, frequency offset estimations, and/or synchronization procedures.

At 702, the UE may transmit, to a base station, a capability indicating support of cross-carrier beam association, as described in connection with the UE capability 610 of FIG. 6. For example, 702 may be performed by a capabilities component 840 of the apparatus 802 of FIG. 8.

At 704, the UE receives, from the base station, an indication of a cross-carrier beam association associated with a first carrier and a second carrier different than the first carrier, as described in connection with the cross-carrier beam associations indication 630 of FIG. 6. For example, 704 may be performed by an associations reception component 842 of the apparatus 802 of FIG. 8. In some examples, the UE may receive the indication via SI. In some examples, the UE may receive the indication via RRC signaling. In some examples, if the UE transmits a capability indicating support of cross-carrier beam association (e.g., at 702), the UE may receive the indication in an RRC message.

In some examples, the first carrier may be different than the second carrier. In some examples, the first carrier and the second carrier may be intra-band carriers, as described above in connection with FIG. 5A. For example, the first carrier and the second carrier may be associated with a same operating band of a frequency range. In some examples, the first carrier and the second carrier may be inter-band carriers. For example, the first carrier may be associated with a first operating band of a first example frequency range and the second carrier may be associated with a second operating band of a second example frequency range. In some examples, the first frequency range may be the same as the second frequency range (e.g., the first operating band and the second operating band are within a same frequency range, such as FR1 or FR2), as described above in connection with FIG. 5A. In some examples, the first frequency range may be different than the second frequency range (e.g., the first operating band is within the first frequency range (FR1) and the second operating band is within the second frequency range (FR2)), as described above in connection with FIG. 5B.

At 706, the UE determines an association between a first set of beams of the first carrier and a second set of beams of the second carrier based on the indication of the cross-carrier beam association, as described in connection with 640 of FIG. 6. For example, 706 may be performed by an associations handler component 844 of the apparatus 802 of FIG. 8.

In some examples, the first set of beams may include a first quantity of beams and the second set of beams may include a second quantity of beams that is the same as the first quantity of beams, as described above in connection with FIG. 5A. In some examples, the first set of beams may include a first quantity of beams and the second set of beams may include a second quantity of beams that is different than the first quantity of beams, as described above in connection with FIG. 5B. In some examples, the first set of beams comprises N beams and the second set of beams comprises N*M beams, as described above in connection with FIG. 5B.

In some examples, the cross-carrier beam association between the first carrier and the second carrier may be determined based on a quasi co-location (QCL) relationship of the first set of beams and the second set of beams, as described above in connection with FIGS. 5A and 5B. In some examples, the first set of beams may be each associated with a first beam width, the second set of beams may be each associated with a second beam width, and the second set of beams based on the second beam width may overlap the first set of beams based on the first beam width, as described above in connection with FIGS. 5A and 5B. In some examples, the second beam width may be the same as the first beam width, as described above in connection with FIG. 5A. In some examples, the second beam width may be approximately equal to 1/M the first beam width, as described above in connection with FIG. 5B.

At 708, the UE receives on the first set of beams and the second set of beams based on the determined cross-carrier beam association, as described in connection with the transmissions using the first set of beams 650 and the transmissions using the second set of beams 652 of FIG. 6. For example, 708 may be performed by a beams reception component 846 of the apparatus 802 of FIG. 8.

In some examples, the indication (e.g., received at 704) may indicate that an SSB of the first set of beams is associated with a RACH occasion (RO). In some such examples, at 710, the UE may select a first subset of beams of the first set of beams based on measurements of an SSB received on the first carrier, as described above in connection with 660 of FIG. 6. For example, 710 may be performed by a beam selection component 848 of the apparatus 802 of FIG. 8. For example, and with respect to the example of FIG. 5B, the UE may select a first subset of beams A2 and A3 of the first set of beams 564 of the first carrier 560. The UE may select the beams of the first subset of beams based on, for example, measurements associated with the SSBs of the first carrier.

At 712, the UE may determine a second subset of beams of the second set of beams where the second subset of beams correspond to the first subset of beams based on the cross-carrier beam association, as described in connection with 660 of FIG. 6. For example, 712 may be performed by the beam selection component 848 of the apparatus 802 of FIG. 8. For example, and referring to the example of FIG. 5B, the UE may select a second subset of beams B3, B4, B5, and B6 of the second set of beams 574 of the second carrier 570. The UE may use the cross-carrier beam associations to determine the second subset of beams of the second set of beams. For example, the UE may use the second cross-carrier beam association 580b to map the beam A2 of the first set of beams 564 to the beams B3 and B4 of the second set of beams 574. The UE may use the third cross-carrier beam association 580c to map the beam A3 of the first set of beams 564 to the beams B5 and B6 of the second set of beams 574.

At 718, the UE may transmit, to the base station, a RACH message through the second subset of beams at the RO, as described in connection with the RACH message 680 of FIG. 6. For example, 718 may be performed by a RACH transmission component 850 of the apparatus 802 of FIG. 8. For example, the UE may use the second subset of beams B3, B4, B5, and B6 (e.g., determined at 712) to transmit the RACH message.

In some examples, the UE may employ techniques for refining the one or more beams used for transmitting the RACH message. For example, at 714, the UE may measure SSBs received through the second subset of beams, as described above in connection with 670 of FIG. 6. In some such examples, when the UE is performing the refining of the one or more beams used for transmitting the RACH message, the UE may avoid measuring SSBs received through the second set of beams that are not included in the second subset of beams. For example, in the example of FIG. 5B, the UE may measure the SSBs received through the beams B3, B4, B5, and B6, while avoiding (or foregoing) the measuring of SSBs received through the beams B1, B2, B7, and B8.

At 716, the UE may refine beams in the second subset of beams based on the measured SSBs received through the second set of beams, as described above in connection with 670 of FIG. 6. For example, 716 may be performed by a beam refinement component 854 of the apparatus 802 of FIG. 8. For example, based on the measurements of the SSBs received through the beams B3, B4, B5, and B6, the UE may determine that the beams B5 and B6 are more suitable for transmitting the RACH message.

The UE may then, at 718, transmit a RACH message through the refined beams in the second subset of beams based on the measured SSBs, as described above in connection with the RACH message 680 of FIG. 6. For example, 718 may be performed by the RACH transmission component 850 of the apparatus 802 of FIG. 8. Referring to the example of FIG. 5B, the UE may determine to transmit the RACH message through the beams B5 and B6 based on the measurements of the SSBs received through the beams B3, B4, B5, and B6.

Figure 8:
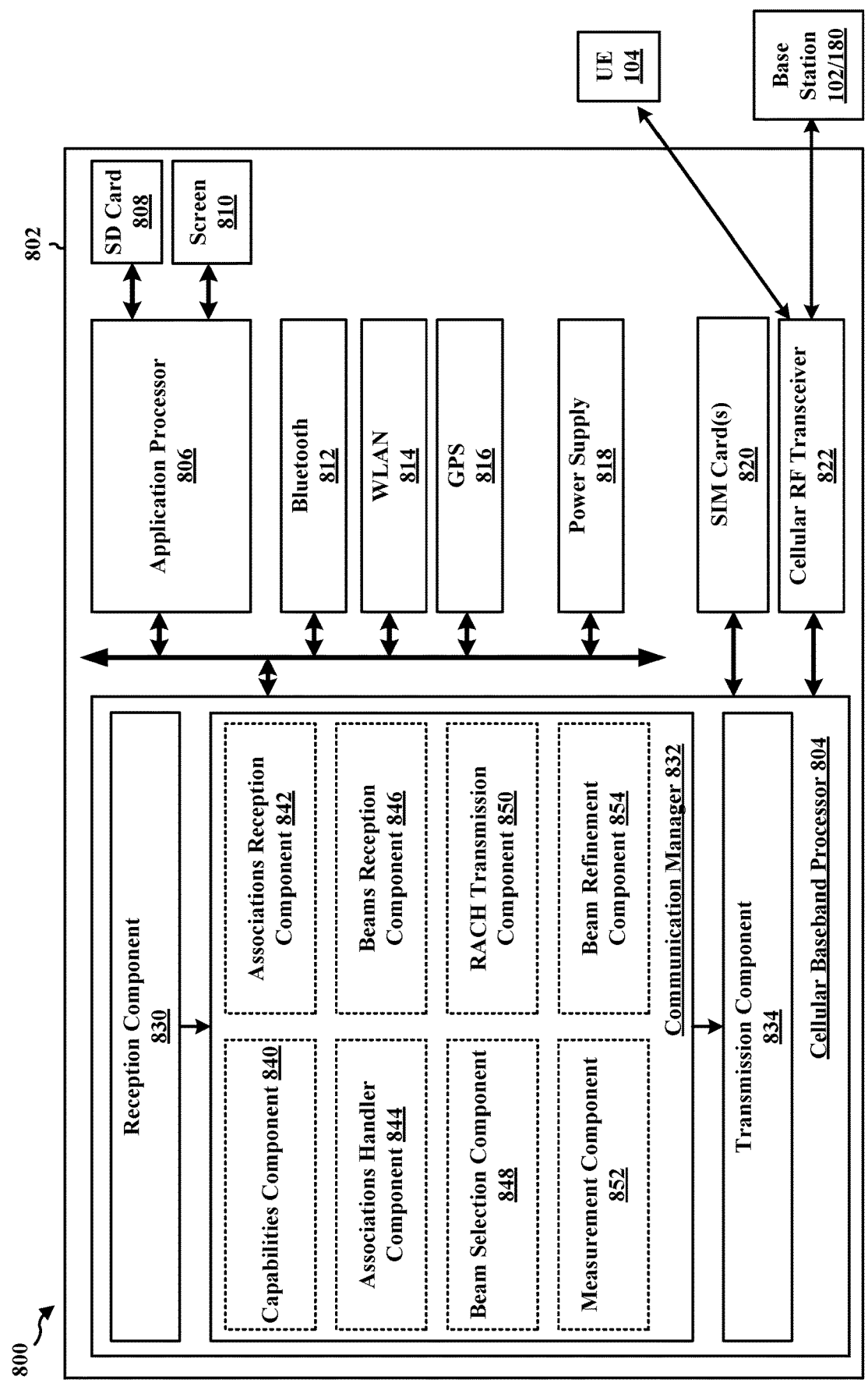
FIG. 8 is a diagram illustrating an example of a hardware implementation for an example apparatus, in accordance with the teachings disclosed herein.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see the UE 350 of FIG. 3) and include the additional modules of the apparatus 802.

The communication manager 832 includes a capabilities component 840 that is configured to transmit, to a base station, a capability indicating support of cross-carrier beam association, for example, as described in connection with 702 of FIG. 7.

The communication manager 832 also includes an associations reception component 842 that is configured to receive, from the base station, an indication of a cross-carrier beam association associated with a first carrier and a second carrier different than the first carrier, for example, as described in connection with 704 of FIG. 7.

The communication manager 832 also includes an associations handler component 844 that is configured to determine an association between a first set of beams of the first carrier and a second set of beams of the second carrier based on the indication of the cross-carrier beam association, for example, as described in connection with 706 of FIG. 7.

The communication manager 832 also includes a beams reception component 846 that is configured to receive on the first set of beams and the second set of beams based on the determined cross-carrier beam association, for example, as described in connection with 708 of FIG. 7.

The communication manager 832 also includes a beam selection component 848 that is configured to select a first subset of beams of the first set of beams based on measurements of an SSB received on the first carrier, for example, as described in connection with 710 of FIG. 7. The example beam selection component 848 may also be configured to determine a second subset of beams of the second set of beams where the second subset of beams correspond to the first subset of beams based on the cross-carrier beam association, for example, as described in connection with 712 of FIG. 7.

The communication manager 832 also includes a RACH transmission component 850 that is configured to transmit, to the base station, a RACH message through the second subset of beams at the RO and/or transmit a RACH message through the refined beams in the second subset of beams based on the measured SSBs, for example, as described in connection with 718 of FIG. 7.

The communication manager 832 also includes a measurement component 852 that is configured to measure SSBs received through the second subset of beams, for example, as described in connection with 714 of FIG. 7.

The communication manager 832 also includes a beam refinement component 854 that is configured to refine beams in the second subset of beams based on the measured SSBs received through the second set of beams, for example, as described in connection with 716 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving, from a base station, an indication of a cross-carrier beam association associated with a first carrier and a second carrier different than the first carrier. The example apparatus 802 also includes means for determining an association between a first set of beams of the first carrier and a second set of beams of the second carrier based on the indication of the cross-carrier beam association. The example apparatus 802 also includes means for receiving on the first set of beams and the second set of beams based on the determined cross-carrier beam association.

In another configuration, the example apparatus 802 may also include means for selecting a first subset of beams of the first set of beams based on measurements of an SSB received on the first carrier. The example apparatus 802 also includes means for determining a second subset of beams of the second set of beams, the second subset of beams corresponding to the first subset of beams based on the cross-carrier beam association. The example apparatus 802 also includes means for transmitting, to the base station, a RACH message through the second subset of beams at the RO.

In another configuration, the example apparatus 802 may also include means for measuring SSBs received through the second subset of beams. The example apparatus 802 also includes means for refining beams in the second subset of beams based on the measured SSBs received through the second set of beams.

In another configuration, the example apparatus 802 may also include means for receiving the indication via system information (SI) or radio resource control (RRC) signaling.

In another configuration, the example apparatus 802 may also include means for transmitting, to the base station, a capability indicating support of cross-carrier beam association, and where the indication is received in a radio resource control (RRC) message.

The aforementioned means may be one or more of the aforementioned components of the apparatus 802 configured to perform the functions recited by the aforementioned means. As described supra, the apparatus 802 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 9:
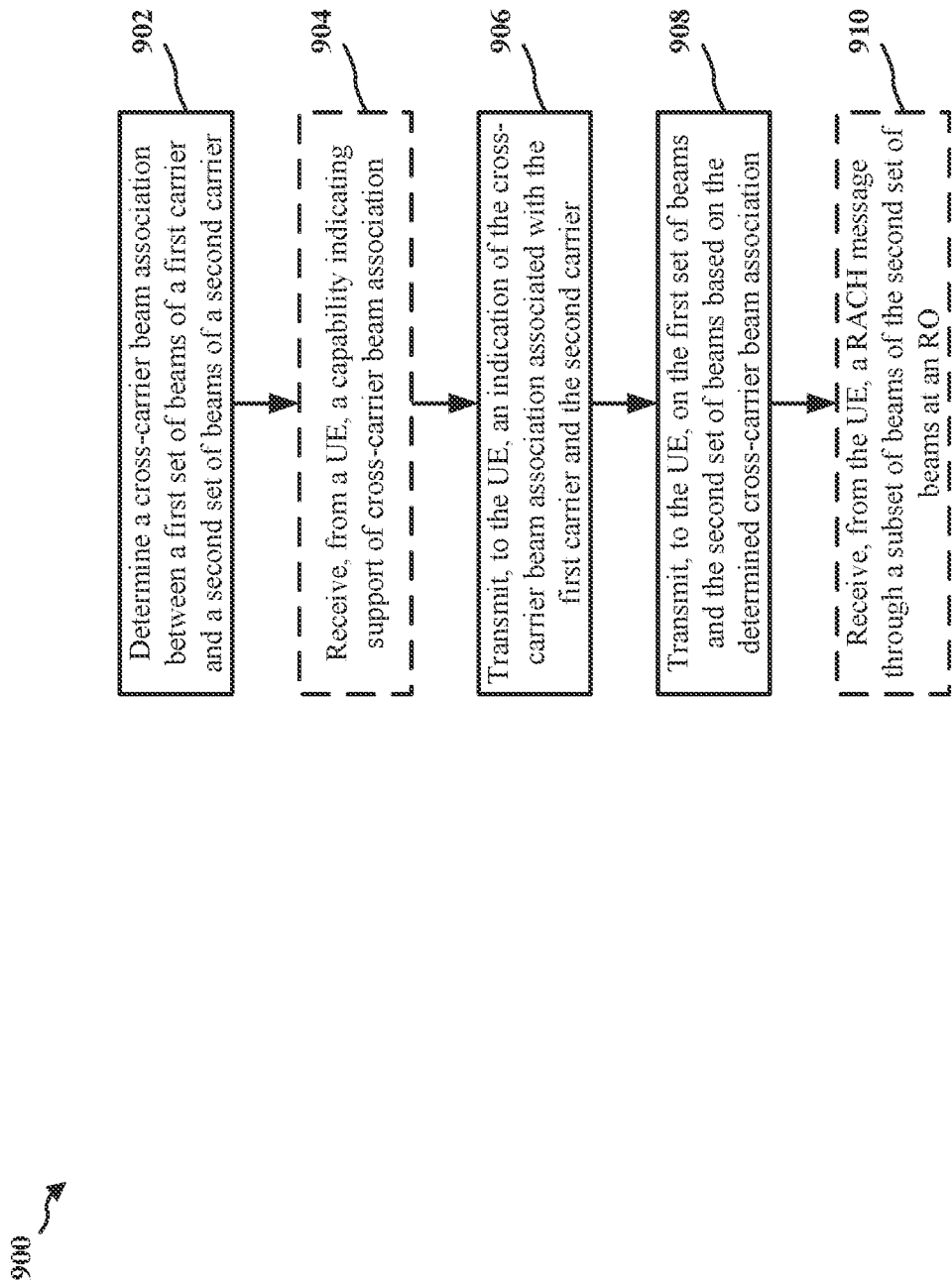
FIG. 9 is a flowchart of a method of wireless communication at a base station, in accordance with the teachings disclosed herein.

FIG. 9 is a flowchart 900 of a method of wireless communication. The method may be performed by a base station (e.g., the base station 102/180, the base station 310, and/or an apparatus 1002 of FIG. 10). Optional aspects are illustrated with a dashed line. The method may enable a base station to determine cross-carrier beams that may share similar characteristics, which may assist a UE with channel estimation, frequency offset estimations, and/or synchronization procedures.

At 902, the base station determines a cross-carrier beam association between a first set of beams of a first carrier and a second set of beams of a second carrier, as described in connection with 620 of FIG. 6. For example, 902 may be performed by an association determination component 1040 of the apparatus 1002 of FIG. 10.

In some examples, the first carrier may be different than the second carrier. In some examples, the first carrier and the second carrier may be intra-band carriers, as described above in connection with FIG. 5A. For example, the first carrier and the second carrier may be associated with a same operating band of a frequency range. In some examples, the first carrier and the second carrier may be inter-band carriers. For example, the first carrier may be associated with a first operating band of a first example frequency range and the second carrier may be associated with a second operating band of a second example frequency range. In some examples, the first frequency range may be the same as the second frequency range (e.g., the first operating band and the second operating band are within a same frequency range, such as FR1 or FR2), as described above in connection with FIG. 5A. In some examples, the first frequency range may be different than the second frequency range (e.g., the first operating band is within the first frequency range (FR1) and the second operating band is within the second frequency range (FR2)), as described above in connection with FIG. 5B.

In some examples, the first set of beams may include a first quantity of beams and the second set of beams may include a second quantity of beams that is the same as the first quantity of beams, as described above in connection with FIG. 5A. In some examples, the first set of beams may include a first quantity of beams and the second set of beams may include a second quantity of beams that is different than the first quantity of beams, as described above in connection with FIG. 5B. In some examples, the first set of beams comprises N beams and the second set of beams comprises N*M beams, as described above in connection with FIG. 5B.

In some examples, the cross-carrier beam association between the first carrier and the second carrier may be determined based on a QCL relationship of the first set of beams and the second set of beams, as described above in connection with FIGS. 5A and 5B. In some examples, the first set of beams may be each associated with a first beam width, the second set of beams may be each associated with a second beam width, and the second set of beams based on the second beam width may overlap the first set of beams based on the first beam width, as described above in connection with FIGS. 5A and 5B. In some examples, the second beam width may be the same as the first beam width, as described above in connection with FIG. 5A. In some examples, the second beam width may be approximately equal to 1/M the first beam width, as described above in connection with FIG. 5B.

At 904, the base station may receive, from a UE, a capability indication support of cross-carrier beam association, as described in connection with the UE capability 610 of FIG. 6. For example, 904 may be performed by a capabilities component 1042 of the apparatus 1002 of FIG. 10.

At 906, the base station transmits, to the UE, an indication of the cross-carrier beam association associated with the first carrier and the second carrier, as described above in connection with the cross-carrier beam associations indication 630 of FIG. 6. For example, 906 may be performed by an indication transmission component 1044 of the apparatus 1002 of FIG. 10. In some examples, the base station may transmit the indication via SI. In some examples, the base station may transmit the indication via RRC signaling. In some examples, if the received capability indication (e.g., at 904) indicates that the UE supports cross-carrier beam association, the base station may transmit the indication to the UE in an RRC message.

At 908, the base station transmits, to the UE, on the first set of beams and the second set of beams based on the determined cross-carrier beam association, as described above in connection with the transmissions using the first set of beams 650 and the transmissions using the second set of beams 652 of FIG. 6. For example, 908 may be performed by a beams transmission component 1046 of the apparatus 1002 of FIG. 10.

In some examples, the indication (e.g., transmitted at 906) may indicate that an SSB of the first set of beams is associated with a RACH occasion (RO). In some such examples, at 910, the base station may receive, from the UE, a RACH message through a subset of beams of the second set of beams at an RO, as described above in connection with the RACH message 680 of FIG. 6. For example, the base station may receive the RACH message through the example second subset of beams B3, B4, B5, and B6 of FIG. 5B. In some examples, the base station may receive the RACH message through a refined subset of beams, such as the example beams B5 and B6 of FIG. 5B.

Figure 10:
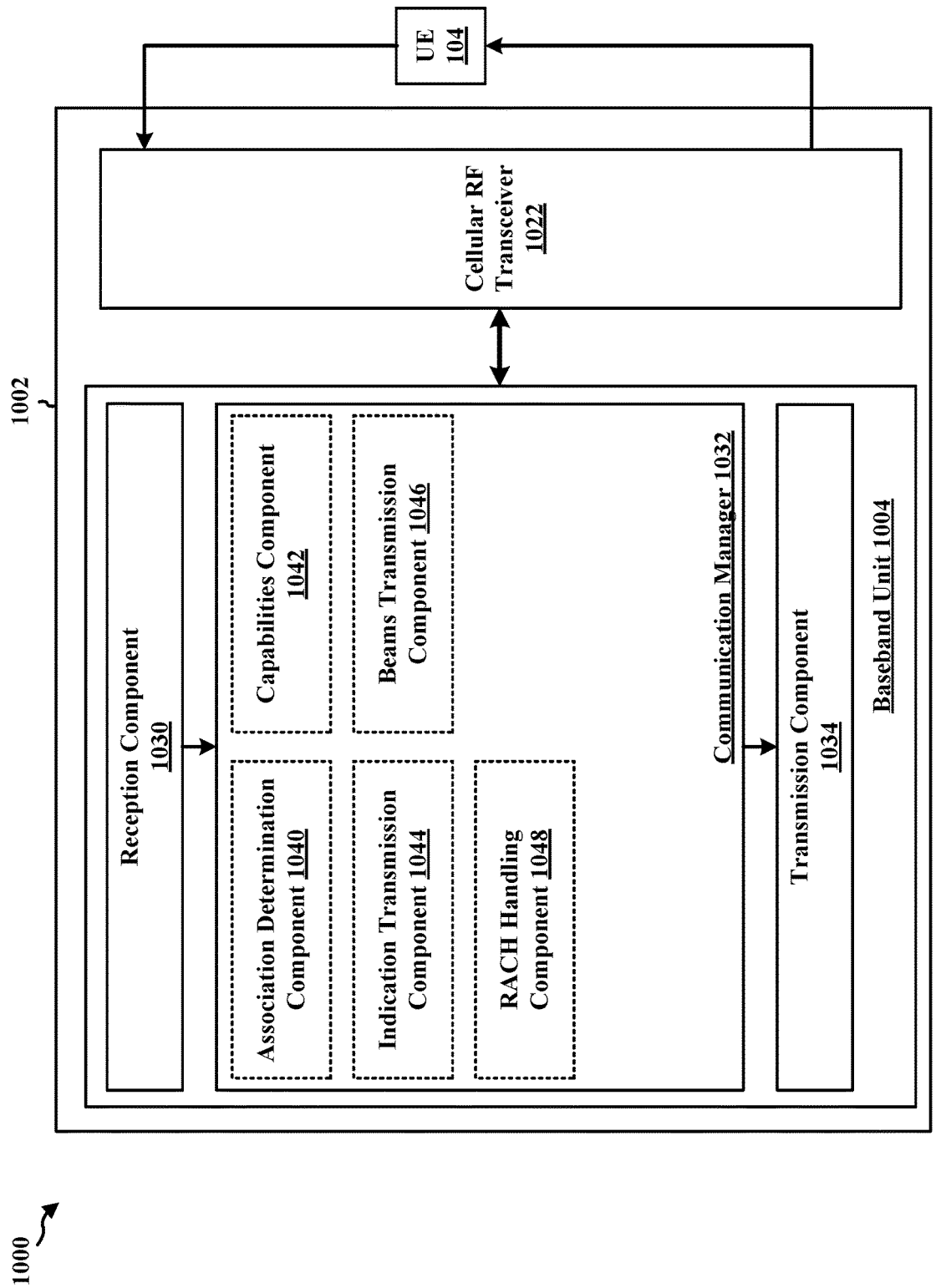
FIG. 10 is a diagram illustrating an example of a hardware implementation for an example apparatus, in accordance with the teachings disclosed herein.

FIG. 10 is a diagram 1000 illustrating an example of a hardware implementation for an apparatus 1002. The apparatus 1002 is a base station and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes an association determination component 1040 that is configured to determine a cross-carrier beam association between a first set of beams of a first carrier and a second set of beams of a second carrier, for example, as described in connection with 902 of FIG. 9.

The communication manager 1032 also includes a capabilities component 1042 that is configured to receive, from a UE, a capability indication support of cross-carrier beam association, for example, as described in connection with 904 of FIG. 9.

The communication manager 1032 also includes an indication transmission component 1044 that is configured to transmit, to the UE, an indication of the cross-carrier beam association associated with the first carrier and the second carrier, for example, as described in connection with 906 of FIG. 9.

The communication manager 1032 also includes a beams transmission component 1046 that is configured to transmit, to the UE, on the first set of beams and the second set of beams based on the determined cross-carrier beam association, for example, as described in connection with 908 of FIG. 9.

The communication manager 1032 also includes a RACH handling component 1048 that is configured to receive, from the UE, a RACH message through a subset of beams of the second set of beams at an RO, for example, as described in connection with 910 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for determining a cross-carrier beam association between a first set of beams of a first carrier and a second set of beams of a second carrier, the first carrier being different than the second carrier. The example apparatus 1002 also includes means for transmitting, to a user equipment (UE), an indication of the cross-carrier beam association associated with the first carrier and the second carrier. The example apparatus 1002 also includes means for transmitting, to the UE, on the first set of beams and the second set of beams based on the determined cross-carrier beam association.

In another configuration, the example apparatus 1002 may also include means for receiving, from the UE, a RACH message through a subset of beams of the second set of beams at the RO.

In another configuration, the example apparatus 1002 may also include means for transmitting the indication via system information (SI) or radio resource control (RRC) signaling.

In another configuration, the example apparatus 1002 may also include means for receiving, from the UE, a capability indicating support of cross-carrier beam association, and where the indication is transmitted in a radio resource control (RRC) message.

The aforementioned means may be one or more of the aforementioned components of the apparatus 1002 configured to perform the functions recited by the aforementioned means. As described supra, the apparatus 1002 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Example techniques disclosed herein enable associating cross-carrier beams based on, for example, one or more similar characteristics. For example, one or more beams of a first carrier may be cross-carrier associated with one or more beams of a second carrier. In some examples, when a first beam of a first carrier is indicated as being cross-carrier associated with a second beam of a second carrier, then characteristics associated with the first beam may be applied to the second beam. For example, if the first beam and the second beam are indicated as having a similar delay spread, then a UE can determine the delay spread for the first beam and apply the determined delay spread to the second beam without separately determining the delay spread for the second beam.

It may be appreciated that by employing one or more of the techniques disclosed herein, the UE may conserve resources (e.g., processing resources) by applying one or more characteristics associated with a beam of a first carrier to one or more beams of a second carrier. In some such examples, the UE may avoid performing measurements on the one or more beams of the second carrier.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user equipment (UE), comprising: receiving, from a base station, an indication of a cross-carrier beam association associated with a first carrier and a second carrier different than the first carrier; determining an association between a first set of beams of the first carrier and a second set of beams of the second carrier based on the indication of the cross-carrier beam association; and receiving on the first set of beams and the second set of beams based on the determined cross-carrier beam association.

Aspect 2 is the method of aspect 1, further including that the indication indicates that a synchronization signal block (SSB) of the first set of beams is associated with a random access channel (RACH) occasion (RO), the method further comprising: selecting a first subset of beams of the first set of beams based on measurements of an SSB received on the first carrier; determining a second subset of beams of the second set of beams, the second subset of beams corresponding to the first subset of beams based on the cross-carrier beam association; and transmitting, to the base station, a RACH message through the second subset of beams at the RO.

Aspect 3 is the method of any of aspect 1 or aspect 2, further including: measuring SSBs received through the second subset of beams; and refining beams in the second subset of beams based on the measured SSBs received through the second set of beams.

Aspect 4 is the method of any of aspects 1 to 3, further including that the first set of beams comprises a first quantity of beams and the second set of beams comprises a second quantity of beams that is a same quantity as the first quantity of beams or that is a different quantity than the first quantity of beams.

Aspect 5 is the method of any of aspects 1 to 4, further including that the first set of beams comprises N beams and the second set of beams comprises N*M beams.

Aspect 6 is the method of any of aspects 1 to 5, further including that the first carrier and the second carrier are inter-band carriers.

Aspect 7 is the method of any of aspects 1 to 6, further including that the first carrier is associated with a first frequency range and the second carrier is associated with a second frequency range that is a same frequency range as the first frequency range or that is a different frequency range than the second frequency range.

Aspect 8 is the method of any of aspects 1 to 5, further including that the first carrier and the second carrier are intra-band carriers.

Aspect 9 is the method of any of aspects 1 to 8, further including that the first set of beams are each associated with a first beam width, where the second set of beams are each associated with a second beam width, and where the second set of beams based on the second beam width overlap the first set of beams based on the first beam width.

Aspect 10 is the method of any of aspects 1 to 9, further including that the second beam width is a same beam width as the first beam width or that is a different beam width than the first beam width.

Aspect 11 is the method of any of aspects 1 to 10, further including that the second beam width is approximately equal to 1/M the first beam width.

Aspect 12 is the method of any of aspects 1 to 11, further including that the cross-carrier beam association between the first carrier and the second carrier is determined based on a quasi co-location (QCL) relationship of the first set of beams and the second set of beams.

Aspect 13 is the method of any of aspects 1 to 12, further including that the indication is received via system information (SI) or radio resource control (RRC) signaling.

Aspect 14 is the method of any of aspects 1 to 13, further including: transmitting, to the base station, a capability indicating support of cross-carrier beam association, and where the indication is received in a radio resource control (RRC) message.

Aspect 15 is an apparatus for wireless communication including a memory and at least one processor coupled to a memory, the memory and the at least one processor configured to implement a method as in any of aspects 1 to 14.

Aspect 16 is an apparatus for wireless communication including means for implementing a method as in any of aspects 1 to 14.

Aspect 17 is a non-transitory computer-readable storage medium storing computer executable code, where the code, when executed, causes a processor to implement a method as in any of aspects 1 to 14.

Aspect 18 is a method of wireless communication at a base station, comprising: determining a cross-carrier beam association between a first set of beams of a first carrier and a second set of beams of a second carrier, the first carrier being different than the second carrier; transmitting, to a user equipment (UE), an indication of the cross-carrier beam association associated with the first carrier and the second carrier; and transmitting, to the UE, on the first set of beams and the second set of beams based on the determined cross-carrier beam association.

Aspect 19 is the method of aspect 18, further including that the indication indicates that a synchronization signal block (SSB) of the first set of beams is associated with a random access channel (RACH) occasion (RO), the method further comprising: receiving, from the UE, a RACH message through a subset of beams of the second set of beams at the RO.

Aspect 20 is the method of any of aspect 18 or aspect 19, further including that the first set of beams comprises a first quantity of beams and the second set of beams comprises a second quantity of beams that is a same quantity as the first quantity of beams or that is a different quantity than the first quantity of beams.

Aspect 21 is the method of any of aspects 18 to 20, further including that the first set of beams comprises N beams and the second set of beams comprises N*M beams.

Aspect 22 is the method of any of aspects 18 to 21, further including that the first carrier and the second carrier are inter-band carriers.

Aspect 23 is the method of any of aspects 18 to 22, further including that the first carrier is associated with a first frequency range and the second carrier is associated with a second frequency range that is a same frequency range as the first frequency range or that is a different frequency range than the second frequency range.

Aspect 24 is the method of any of aspects 18 to 21, further including that the first carrier and the second carrier are intra-band carriers.

Aspect 25 is the method of any of aspects 18 to 24, further including that the first set of beams are each associated with a first beam width, where the second set of beams are each associated with a second beam width, and where the second set of beams based on the second beam width overlap the first set of beams based on the first beam width.

Aspect 26 is the method of any of aspects 18 to 25, further including that the second beam width is a same beam width as the first beam width or that is a different beam width than the first beam width.

Aspect 27 is the method of any of aspects 18 to 26, further including that the second beam width is approximately equal to 1/M the first beam width.

Aspect 28 is the method of any of aspects 18 to 27, further including that the cross-carrier beam association between the first carrier and the second carrier is determined based on a quasi co-location (QCL) relationship of the first set of beams and the second set of beams.

Aspect 29 is the method of any of aspects 18 to 28, further including that the indication is transmitted via system information (SI) or radio resource control (RRC) signaling.

Aspect 30 is the method of any of aspects 18 to 29, further including: receiving, from the UE, a capability indicating a support of cross-carrier beam association, and where the indication is transmitted in a radio resource control (RRC) message.

Aspect 31 is an apparatus for wireless communication including a memory and at least one processor coupled to a memory, the memory and the at least one processor configured to implement a method as in any of aspects 18 to 30.

Aspect 32 is an apparatus for wireless communication including means for implementing a method as in any of aspects 18 to 30.

Aspect 33 is a non-transitory computer-readable storage medium storing computer executable code, where the code, when executed, causes a processor to implement a method as in any of aspects 18 to 30.

What is claimed is:

1. A method of wireless communication at a user equipment (UE), comprising:
    receiving an indication of a cross-carrier beam association associated with a first carrier and a second carrier different than the first carrier;
    selecting a first subset of beams of a first set of beams based on measurements of a transmission received on the first carrier;
    transmitting a message via a second subset of beams of a second set of beams, the second subset of beams corresponding to the first subset of beams based on the cross-carrier beam association, wherein:
        the transmission is a synchronization signal block (SSB) of the first set of beams,
        the message is a random access channel (RACH) message,
        the indication further indicates the SSB of the first set of beams is associated with a RACH occasion (RO), and
        the transmission comprises transmitting the RACH message via the second subset of beams at the RO; or
    receiving on the first set of beams and the second set of beams based on an association between the first set of beams of the first carrier and a second set of beams of the second carrier, said association being based on the indication of the cross-carrier beam association.

2. The method of claim 1, further comprising:
    receiving SSBs via the second subset of beams;
    measuring the received SSBs; and
    refining beams in the second subset of beams based on the measurement associated with the received SSBs.

3. The method of claim 1, wherein the first set of beams comprises a first quantity of beams and the second set of beams comprises a second quantity of beams that is a same quantity as the first quantity of beams or that is a different quantity than the first quantity of beams.

4. The method of claim 1, wherein the first set of beams comprises N beams and the second set of beams comprises N*M beams.

5. The method of claim 1, wherein the first carrier and the second carrier are inter-band carriers.

6. The method of claim 1, wherein the first carrier is associated with a first frequency range and the second carrier is associated with a second frequency range that is a same frequency range as the first frequency range or that is a different frequency range than the second frequency range.

7. The method of claim 1, wherein the first carrier and the second carrier are intra-band carriers.

8. The method of claim 1, wherein each beam of the first set of beams is associated with a first beam width, wherein each beam of the second set of beams is associated with a second beam width, and wherein the second set of beams overlaps the first set of beams.

9. The method of claim 8, wherein the second beam width is a same beam width as the first beam width or is a different beam width than the first beam width.

10. The method of claim 8, wherein the second beam width is approximately equal to 1/M the first beam width.

11. The method of claim 1, wherein the cross-carrier beam association between the first carrier and the second carrier is based on a quasi co-location (QCL) relationship of the first set of beams and the second set of beams.

12. The method of claim 1, wherein the indication is received via system information (SI) or radio resource control (RRC) signaling.

13. The method of claim 1, further comprising:
    transmitting a capability indicating support of the cross-carrier beam association, wherein the indication is received, after the transmission of the capability, in a radio resource control (RRC) message.

14. A user equipment (UE), comprising:
    a transceiver;
    memory comprising instructions; and
    at least one processor configured to execute the instructions to cause the UE to:
        receive, via the transceiver, an indication of a cross-carrier beam association associated with a first carrier and a second carrier different than the first carrier;
        determine an association between a first set of beams of the first carrier and a second set of beams of the second carrier based on the indication of the cross-carrier beam association;
        select a first subset of beams of the first set of beams based on measurements of a transmission received on the first carrier;
        transmit, via the transceiver, a message via a second subset of beams of the second set of beams, the second subset of beams corresponding to the first subset of beams based on the cross-carrier beam association, wherein:
            the transmission is a synchronization signal block (SSB) of the first set of beams,
            the message is a random access channel (RACH) message,
            the indication further indicates the SSB of the first set of beams is associated with a RACH occasion (RO), and
            the transmission comprises transmitting the RACH message via the second subset of beams at the RO; or
        receive, via the transceiver, on the first set of beams and the second set of beams based on the determined association.

15. The UE of claim 14, wherein the at least one processor is further configured to cause the UE to:
    receive, via the transceiver and the second subset of beams, SSBs;

measure the received SSBs; and
refine beams in the second subset of beams based on the measurement associated with the received SSBs.

16. The UE of claim 14, wherein the first set of beams comprises a first quantity of beams and the second set of beams comprises a second quantity of beams that is a same quantity as the first quantity of beams or that is a different quantity than the first quantity of beams.

17. A method of wireless communication at a base station, comprising:
transmitting an indication of a cross-carrier beam association between a first set of beams of a first carrier and a second set of beams of a second carrier, the first carrier being different than the second carrier;
transmitting a first set of transmissions via at least a first subset of beams of the first set of beams;
receiving a message via a second subset of beams of the second set of beams, wherein the first subset of beams is based on the first set of transmissions and the second subset of beams corresponds to the first subset of beams based on the cross-carrier beam association, wherein:
the reception is a synchronization signal block (SSB) of the first set of beams,
the message is a random access channel (RACH) message,
the indication further indicates that SSB of the first set of beams is associated with a RACH occasion (RO), and
the reception comprises receiving the RACH message via the second subset of beams at the RO; or
transmitting on the first set of beams and the second set of beams based on the cross-carrier beam association.

18. The method of claim 17, wherein the first set of transmissions comprises a synchronization signal block (SSB) of the first set of beams and the message is a random access channel (RACH) message, wherein the indication further indicates that the SSB of the first set of beams is associated with a RACH occasion (RO), wherein receiving the message comprises, receiving the RACH message through the second subset of beams of the second set of beams at the RO.

19. The method of claim 17, wherein the first set of beams comprises a first quantity of beams and the second set of beams comprises a second quantity of beams that is a same quantity as the first quantity of beams or that is a different quantity than the first quantity of beams.

20. The method of claim 17, wherein the first set of beams comprises N beams and the second set of beams comprises N*M beams.

21. The method of claim 17, wherein the first carrier and the second carrier are inter-band carriers.

22. The method of claim 17, wherein the first carrier is associated with a first frequency range and the second carrier is associated with a second frequency range that is a same frequency range as the first frequency range or that is a different frequency range than the second frequency range.

23. The method of claim 17, wherein the first carrier and the second carrier are intra-band carriers.

24. The method of claim 17, wherein each beam of the first set of beams is associated with a first beam width, wherein each beam of the second set of beams is associated with a second beam width, and wherein the second set of beams overlaps the first set of beams.

25. The method of claim 24, wherein the second beam width is a same beam width as the first beam width or is a different beam width than the first beam width.

26. The method of claim 24, wherein the second beam width is approximately equal to 1/M the first beam width.

27. The method of claim 17, wherein the cross-carrier beam association between the first carrier and the second carrier is based on a quasi co-location (QCL) relationship of the first set of beams and the second set of beams.

28. The method of claim 17, wherein the indication is transmitted via system information (SI) or radio resource control (RRC) signaling.

29. The method of claim 17, further comprising:
receiving a capability indicating support of the cross-carrier beam association, wherein the indication is transmitted, after the reception of the capability, in a radio resource control (RRC) message.

30. A base station, comprising:
a transceiver;
memory comprising instructions; and
at least one processor configured to execute the instructions to cause the base station to:
transmit, via the transceiver, an indication of a cross-carrier beam association between a first set of beams of a first carrier and a second set of beams of a second carrier, the first carrier being different than the second carrier;
transmit, via the transceiver, a first set of transmissions via at least a first subset of beams of the first set of beams;
receive, via the transceiver, a message via a second subset of beams of the second set of beams, wherein the first subset of beams is based on the first set of transmissions and the second subset of beams corresponds to the first subset of beams based on the cross-carrier beam association, wherein:
the reception is a synchronization signal block (SSB) of the first set of beams,
the message is a random access channel (RACH) message,
the indication further indicates that SSB of the first set of beams is associated with a RACH occasion (RO), and
the reception comprises receiving the RACH message via the second subset of beams at the RO; or
transmit, the transceiver, on the first set of beams and the second set of beams based on the cross-carrier beam association.

* * * * *